United States Patent
Huang

(10) Patent No.: US 12,042,725 B2
(45) Date of Patent: Jul. 23, 2024

(54) METHOD FOR NETWORK DETECTION, ELECTRONIC DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Yuan Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 459 days.

(21) Appl. No.: 17/460,882

(22) Filed: Aug. 30, 2021

(65) Prior Publication Data
US 2021/0394057 A1  Dec. 23, 2021

Related U.S. Application Data

(63) Continuation of application No. PCT/CN2020/078013, filed on Mar. 5, 2020.

(30) Foreign Application Priority Data

Mar. 19, 2019 (CN) .......................... 201910209982.8

(51) Int. Cl.
A63F 13/358 (2014.01)
H04L 43/0852 (2022.01)

(52) U.S. Cl.
CPC ........ *A63F 13/358* (2014.09); *H04L 43/0852* (2013.01)

(58) Field of Classification Search
CPC .................. A63F 13/358; A63F 13/335; A63F 2300/535; A63F 13/45; H04L 43/0852; Y02D 30/70
See application file for complete search history.

(56) References Cited

U.S. PATENT DOCUMENTS 9,895,604 B2* 2/2018 Hall ...................... H04W 4/027
2007/0298823 A1* 12/2007 Sherif .................. H04W 28/10
455/518
(Continued)

FOREIGN PATENT DOCUMENTS

CN  1893347    1/2007
CN  101150763  3/2008
(Continued)

OTHER PUBLICATIONS

EPO, Extended European Search Report for EP Application No. 20773126.6, Mar. 23, 2022.
(Continued)

*Primary Examiner* — Abdullahi E Salad
(74) *Attorney, Agent, or Firm* — Hodgson Russ LLP

(57) ABSTRACT

A method for network detection, an electronic device, and a non-transitory computer-readable storage medium are provided. The method includes the following. Determine whether a first game data packet is a first target data packet when a target game application of an electronic device transmits the first game data packet to a server. A first time point at which the first game data packet is transmitted is recorded when the first game data packet is the first target data packet. Determine whether a second game data packet is a second target data packet when the target game application receives the second game data packet from the server. A second time point at which the second game data packet is received is recorded when the second game data packet is the second target data packet. A network delay of the target game application is obtained.

18 Claims, 5 Drawing Sheets

(56) References Cited

U.S. PATENT DOCUMENTS

| | | | | |
|---|---|---|---|---|
| 2011/0170537 | A1* | 7/2011 | Ungureanu | H04L 43/106 |
| | | | | 379/32.01 |
| 2014/0369234 | A1* | 12/2014 | Vleugels | H04W 8/005 |
| | | | | 370/254 |
| 2015/0295635 | A1* | 10/2015 | Koskiahde | H04L 12/2863 |
| | | | | 370/315 |

FOREIGN PATENT DOCUMENTS

| | | |
|---|---|---|
| CN | 102298334 | 12/2011 |
| CN | 102571479 | 7/2012 |
| CN | 102664833 | 9/2012 |
| CN | 102769616 | 11/2012 |
| CN | 102769616 | 3/2015 |
| CN | 104954197 | 9/2015 |
| CN | 105721602 | 6/2016 |
| CN | 106341743 | 1/2017 |
| CN | 106792262 | 5/2017 |
| CN | 106982151 | 7/2017 |
| CN | 206313803 | 7/2017 |
| CN | 107450966 | 12/2017 |
| CN | 107547290 | 1/2018 |
| CN | 103780619 | 2/2018 |
| CN | 108449771 | 8/2018 |
| CN | 109173267 | 1/2019 |
| CN | 108379247 A * | 2/2019 |
| CN | 109309605 | 2/2019 |
| CN | 109379247 | 2/2019 |
| CN | 109495330 | 3/2019 |
| JP | 2004201196 | 7/2004 |

OTHER PUBLICATIONS

Lu, "Cyberspace Security Technology Practical Course," Sep. 2017.

CNIPA, First Office Action for CN Application No. 202110160936.0, Jul. 1, 2022.

WIPO, International Search Report for PCT/CN2020/078013, Jun. 4, 2020.

"How to Calculate Network Delay in Online Games?" Retrieved from the internet: <https://www.zhihu.com/question/56516380>, Mar. 7, 2017, 1 page.

CNIPA, First Office Action for CN Application No. 201910209982.8, Oct. 20, 2020.

CNIPA, Notification to Grant Patent Right for Invention for CN Application No. 201910209982.8, Dec. 25, 2020.

* cited by examiner 15864 2019-01-25 07:50:11.861903  lwx.smoba.qq.com      192.168.0.184  receive      UDP           64
Frame 15864: 64 bytes on wire (512 bits), 64 bytes captured (512 bits)
Linux cooked capture
Internet Protocol Version 4, Src: lwx.smoba.qq.com (180.97.116.141), Dst: 192.168.0.184 (192.168.0.184)
User Datagram Protocol, Src Port: 5008, Dst Port: 41593
▲ Data (20 bytes)
    Data: 7e9c51a7000003e00004000030d5000010004141
    [Length: 20]

ND NON-TRANSITORY COMPUTER-READABLE STORAGE MEDIUM

METHOD FOR NETWORK DETECTION, ELECTRONIC DEVICE, AND NON-TRANSITORY COMPUTER-READABLE STORAGE MEDIUM

CROSS-REFERENCE TO RELATED APPLICATION(S)

This application is a continuation of International Application No. PCT/CN2020/078013, filed on Mar. 5, 2020, which claims priority to Chinese Patent Application No. 201910209982.8, filed on Mar. 19, 2019, the entire disclosures of which are incorporated herein by reference.

TECHNICAL FIELD

This disclosure relates to the technical field of electronic, and more particularly to a method for network detection, an electronic device, and a non-transitory computer-readable storage medium.

BACKGROUND

During playing online games with electronic devices, if a network is unstable, data-packet loss or delay fluctuation occurs, which may cause game lag and even affect game experience. To conduct network optimization for game applications, it needs to first identify a current network state, and then the network optimization is conducted. Therefore, it is important to accurately detect a network delay of the game application and identify the current network state during network optimization for the game application.

SUMMARY

Implementations of the disclosure provide a method for network detection, an electronic device, and a non-transitory computer-readable storage medium.

According to a first aspect, a method for network detection is provided. The method is applicable to an electronic device. The method includes the following. Determine whether a first game data packet is a first target data packet in response to detecting that a target game application of the electronic device transmits the first game data packet to a server. A first time point at which the first game data packet is transmitted is recorded, in response to determining that the first game data packet is the first target data packet. Determine whether a second game data packet is a second target data packet in response to detecting that the target game application receives the second game data packet from the server, where the second target data packet is a data packet transmitted to the target game application by the server in response to reception of the first target data packet. A second time point at which the second game data packet is received is recorded in response to determining that the second game data packet is the second target data packet. A network delay of the target game application is obtained according to the first time point and the second time point.

According to a second aspect, an electronic device is provided. The electronic device includes a processor and a memory storing one or more programs. The one or more programs which, when executed by the processor, cause the processor to: determine whether a first game data packet is a first target data packet in response to detecting that a target game application of the electronic device transmits the first game data packet to a server, record a first time point at which the first game data packet is transmitted in response to determining that the first game data packet is the first target data packet, determine whether a second game data packet is a second target data packet in response to detecting that the target game application receives the second game data packet from the server, where the second target data packet is a data packet transmitted to the target game application by the server in response to reception of the first target data packet, record a second time point at which the second game data packet is received in response to determining that the second game data packet is the second target data packet, and obtain a network delay of the target game application according to the first time point and the second time point.

According to a third aspect, a non-transitory computer-readable storage medium is provided. The non-transitory computer-readable storage medium stores computer programs. The computer programs, when executed by a processor, cause the processor to: determine whether a first game data packet is a first target data packet in response to detecting that a target game application of the electronic device transmits the first game data packet to a server, record a first time point at which the first game data packet is transmitted in response to determining that the first game data packet is the first target data packet, determine whether a second game data packet is a second target data packet in response to detecting that the target game application receives the second game data packet from the server, where the second target data packet is a data packet transmitted to the target game application by the server in response to reception of the first target data packet, record a second time point at which the second game data packet is received in response to determining that the second game data packet is the second target data packet, and obtain a network delay of the target game application according to the first time point and the second time point.

BRIEF DESCRIPTION OF THE DRAWINGS

To describe the technical solutions of the implementations of the disclosure or the related art more clearly, the following will give a brief description of accompanying drawings used for describing the implementations or the related art.

FIG. 1C is a schematic diagram illustrating a UDP data packet according to other implementations of the disclosure.

DETAILED DESCRIPTION

In order to enable those skilled in the art to better understand solutions of the disclosure, technical solutions embodied in implementations of the disclosure will be described in a clear and comprehensive manner in conjunction with the accompanying drawings. It is evident that the implementations described herein are merely some rather than all the implementations of the disclosure. All other implementations obtained by those of ordinary skill in the art based on the implementations of the disclosure without creative efforts shall fall within the protection scope of the disclosure.

The terms "first", "second", "third", and "fourth", and the like used in the specification, the claims, and the accompany drawings of the disclosure are used to distinguish different objects rather than describe a particular order. The terms "include", "comprise", and "have" as well as variants thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or characteristic described in conjunction with the implementation may be contained in at least one implementation of the disclosure. The phrase appearing in various places in the specification does not necessarily refer to the same implementations, nor does it refer to an independent or alternative implementation that is mutually exclusive with other implementations. It is expressly and implicitly understood by those skilled in the art that an implementation described herein may be combined with other implementations.

The electronic devices involved in the implementations of the disclosure may be electronic devices with network detection capabilities and include various handheld devices, vehicle-mounted devices, wearable devices, computing devices that have wireless communication functions or other processing devices connected to wireless modems, as well as various forms of user equipment (UE), mobile stations (MS), terminal devices, and the like, and the like.

The following will describe the implementations of the disclosure in detail.

Figures 1A, 1B:
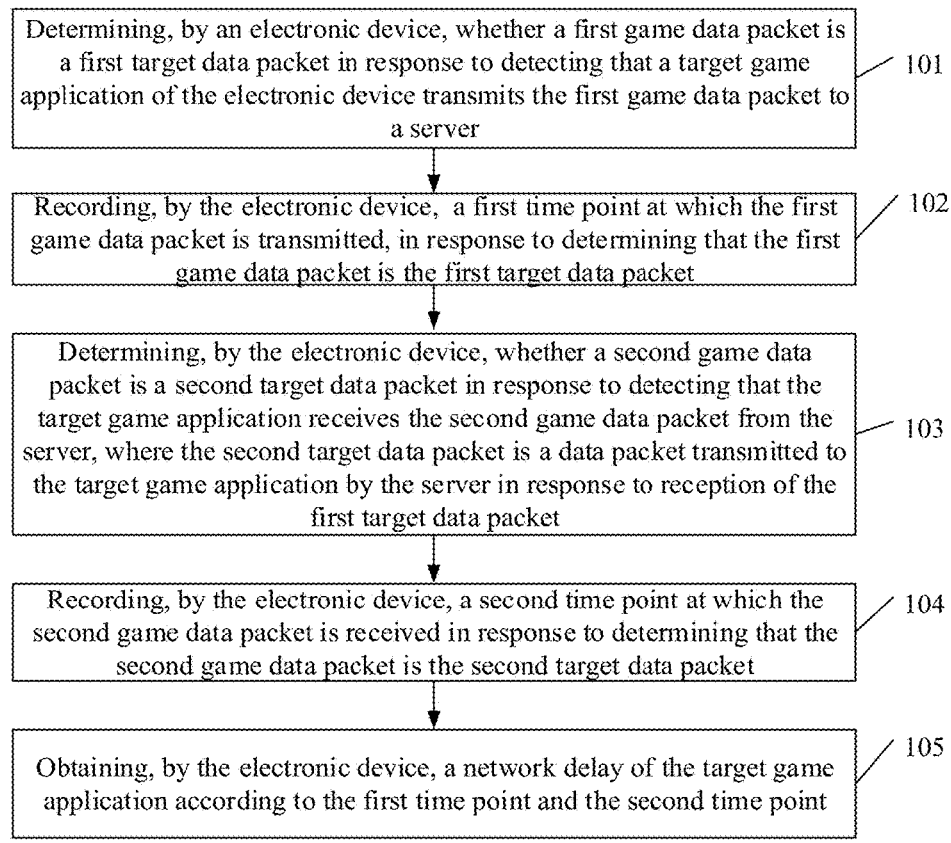
FIG. 1A is a schematic flow chart illustrating a method for network detection according to implementations of the disclosure.
FIG. 1B is a schematic diagram illustrating a user datagram protocol (UDP) data packet according to implementations of the disclosure.

FIG. 1A is a schematic flow chart illustrating a method for network detection according to implementations of the disclosure. The method is applicable to an electronic device. As illustrated in FIG. 1A, the method begins at block 101.

At block 101, the electronic device determines whether a first game data packet is a first target data packet in response to detecting that a target game application of the electronic device transmits the first game data packet to a server.

In the related art, a network delay of a game application is generally obtained as follows. The game application obtains through a specific interface a game network delay reported by a game manufacturer, that is, the network delay of the game application is obtained from the outside. Alternatively, the game application determines the network delay by analyzing characteristics of transmitted or received game data packets, such as a size of a game data packet, a transmitting frequency, a receiving frequency, and the like. Different from the related art, implementations of the disclosure provide a method for accurately and efficiently detecting the network delay according to parameters of data packets of the game application.

During data packet transmission through a network, the target game application may periodically transmit user datagram protocol (UDP) data packets to the server. Each time the server receives a UDP data packet from the target game application, the server may reply another UDP data packet (i.e., a message) to the target game application. In implementations of the disclosure, the first target data packet and the second target data packet are UDP data packets used for detecting the network delay of the target game application. Since data packets transmitted to the server by the target game application not only include UDP data packets used for detecting the network delay of the target game application, but also include data packets for other purposes and data packets of other types, it is necessary to determine whether the first data packet is a UDP data packet for detecting the network delay upon detecting that the target game application transmits the first game data packet to the server.

At block 102, the electronic device records a first time point at which the first game data packet is transmitted, in response to determining that the first game data packet is the first target data packet.

At block 103, the electronic device determines whether a second game data packet is a second target data packet in response to detecting that the target game application receives the second game data packet from the server, where the second target data packet is a data packet transmitted to the target game application by the server in response to reception of the first target data packet.

The server may transmit the second target data packet for detecting the network delay to the target game application only when the server receives the first target data packet from the target game application. When the electronic device detects that the target game application receives the second game data packet from the server, it is necessary to determine whether the second game data packet is the second target data packet for detecting the network delay.

At block 104, the electronic device records a second time point at which the second game data packet is received in response to determining that the second game data packet is the second target data packet.

At block 105, the electronic device obtains the network delay of the target game application according to the first time point and the second time point.

The first time point T1 is recorded when it is detected that the target game application transmits the first target data packet, and the second time point T2 is recorded when it is detected that the second target data packet is received by the target game application. Thereafter, an absolute value |T2−T1| of a difference between the first time point and the second time point is calculated, to obtain the network delay of the target game application. The first time point may be a moment at which the target game application transmits the first target data packet, and the second time point may be a moment at which the second target data packet is received by the target game application.

As can be seen, in implementations of the disclosure, the electronic device determines whether the first game data packet is the first target data packet when the electronic device detects that the target game application transmits the first game data packet to the server, and records the first time point at which the first game data packet is transmitted when the electronic device determines that the first game data packet is the first target data packet. Thereafter, the electronic device determines whether the second game data packet is the second target data packet when the electronic device detects that the target game application receives the second game data packet from the server, where the second target data packet is the data packet transmitted to the target game application by the server in response to reception of the first target data packet, and records the second time point at which the second game data packet is received when the electronic device determines that the second game data packet is the second target data packet. The network delay of the target game application is calculated according to the first time point and the second time point, and the network delay of the target game application is saved. Since the electronic device can record the first time point at which the first target data packet is transmitted by the target game application and the second time point at which the second target data packet is received by the target game application, where the first target data packet and the second target data packet are both used for detecting the network delay of the target game application, the network delay of the target game application can be calculated according to the first time point and the second time point, thereby facilitating network optimization of the target game application.

In at least one implementation, the first target data packet and the second target data packet are the UDP data packets for detecting the network delay of the target game application, and the method further includes the following. Multiple UDP data packets for detecting the network delay of the target game application are obtained, where the multiple UDP data packets include the first target data packet and the second target data packet. Multiple pieces of valid data of each of the multiple UDP data packets are obtained, where each UDP data packet has a piece of valid data, and for each UDP data packet, the valid data of the UDP data packet is data in the UDP data packet excluding a UDP header. First fixed data and second fixed data are determined from the multiple pieces of valid data by comparing the multiple pieces of valid data, where the first fixed data has a same byte length and a same position as the second fixed data, the first fixed data is associated with the first target data packet, and the second fixed data is associated with the second target data packet. The byte length of the first fixed data and the second fixed data is determined as a specified byte length associated with the target game application, and an offset of first byte data in the first fixed data relative to first byte data in the valid data corresponding to the first fixed data or an offset of first byte data in the second fixed data relative to first byte data in the valid data corresponding to the second fixed data is determined as a specified offset.

In one example, the first fixed data having a same byte length and a same position as the second fixed data means that the byte length and the position of the first fixed data in the first valid data are the same as that of the second fixed data in the second valid data. For example, if the first fixed data of the first target data packet for detecting the network delay has 8 bytes and is obtained starting from a position at which the start of the valid data corresponding to the first fixed data is offset by 4 bytes, the second fixed data of the second target data packet for detecting the network delay also has 8 bytes and is obtained starting from a position at which the start of the valid data corresponding to the second fixed data is offset by 4 bytes.

The UDP data packet is not reliable and also does not have a sequence number and flow control fields, but the UDP has a relatively short delay and a relatively high data transmission efficiency during data transmission since the UDP has fewer control options, and thus the UDP is suitable for applications with low reliability requirements or guaranteed reliability. For example, the network delay of the game application can be detected through UDP data packets. Each UDP data packet includes two parts: a UDP header and a UDP data area. The UDP data packet consists of four 8-byte fields, which are respectively used for describing a source port, a destination port, a length, and a check value of the data packet. Valid data of the UDP data packet is stored in the UDP data area.

Figure 1C:
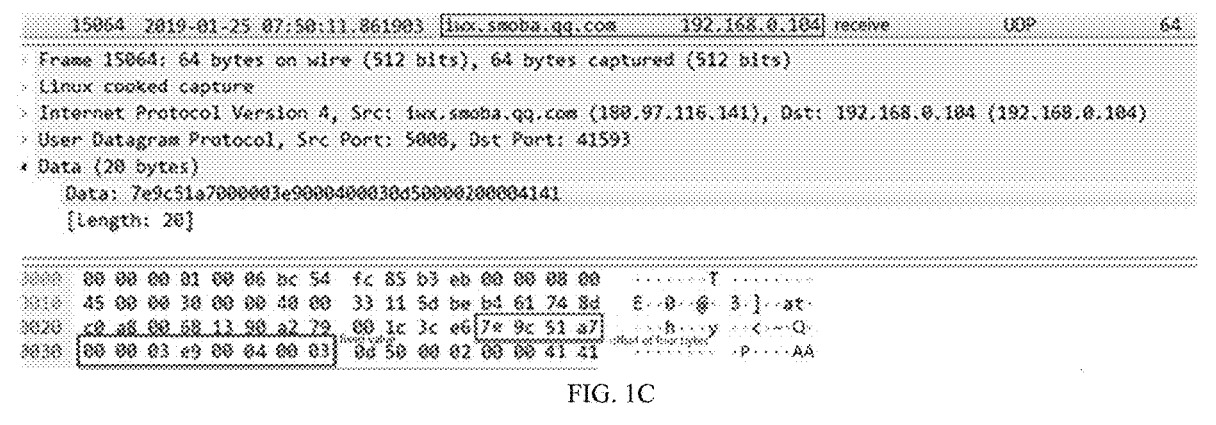

Multiple pieces of valid data of UDP data packets used for detecting the network delay of the game application have a same feature. For example, as illustrated in FIG. 1B, by analyzing UDP data packets transmitted by the target game application, it is found that in each UDP data packet there are 8 fixed bytes, which are 00 00 00 01 00 03, starting from a position at which the start of the valid data of the UDP data packet is offset by 4 bytes. Similarly, as illustrated in FIG. 1C, by analyzing UDP data packets replied by the server, it is found that in each UDP data packet there are 8 fixed bytes, which are 00 00 03 e9 00 04 00 03, starting from a position at which the start of the valid data of the UDP data packet is offset by 4 bytes. Since UDP data packets of different game applications has fixed bytes with different byte lengths and starting from different offset positions of valid data, before implementing the method for network delay detection provided herein, it is necessary to obtain and analyze multiple UDP data packets used for detecting the network delay of the target game application, to obtain a specified offset and a specified byte length corresponding to the target game application.

In one example, the UDP data packets of different game applications has fixed bytes with different byte lengths and starting from different offset positions of valid data. For example, for game application A, fixed data of UDP data packets for detecting the network delay of game application A has 8 bytes and is obtained starting from a position at which the start of valid data corresponding to the fixed data is offset by 4 bytes, but for game application B, fixed data of UDP data packets for detecting the network delay of game application B may only have 7 bytes and may be obtained starting from a position at which the start of valid data corresponding to the fixed data is offset by 3 bytes.

In one example, after the multiple UDP data packets used for detecting the network delay of the target game application are obtained, the valid data of each of the multiple UDP data packets is obtained to obtain multiple pieces of valid data, and the multiple pieces of valid data are compared to determine, from the multiple pieces of valid data, fixed data having a same byte length and a same position. Thereafter, the byte length of the fixed data is determined to be a specified byte length associated with the target game application, and an offset of first byte data in the fixed data relative to first byte data in valid data corresponding to the fixed data is determined to be a specified offset.

That is, by analyzing the multiple UDP data packets, the first fixed data in first valid data of the first target data packet and the second fixed data in second valid data of the second target data packet can be determined. The specified offset and the specified byte length associated with the target game application can be determined according to the first fixed data and the second fixed data, such that the first target data packet and the second target data packet during transmitting and receiving data packets by the target game application can be determined.

In at least one implementation, determine whether the first game data packet is the first target data packet as follows. First valid data of the first game data packet is obtained. First data is obtained, where the first data has a specified byte length from a specified offset position of the first valid data, and the specified offset position is a position at which the start of the first valid data is offset by a specified offset.

Determine that the first game data packet is the first target data packet, in response to detecting that the first data and the first fixed data match.

In one example, when the target game application transmits the first game data packet, the first valid data of the first game data packet is obtained, and then starting from the specific offset position of the first valid data, the first data having the specified byte length is obtained. Thereafter, determine whether the first data and the first fixed data match; if yes, determine that the first game data packet is the first target data packet.

As can be seen, according to the first valid data of the first game data packet, determine whether the first data having the specified byte length which is obtained starting from the specified offset position of the first valid data matches the first fixed data, to determine whether the first game data packet is the first target data packet. Therefore, the first time point at which the first target data packet is transmitted by the target game application can be determined.

In at least one implementation, determine whether the second game data packet is the second target data packet as follows. Second valid data of the second game data packet is obtained. Second data is obtained, where the second data has a specified byte length from a specified offset position of the second valid data, and the specified offset position is a position determined by offsetting the start of the second valid data by a specified offset. Determine that the second game data packet is the second target data packet, in response to detecting that the second data and the second fixed data match.

In one example, when the target game application receives the second game data packet, the second valid data of the second game data packet is obtained, and then starting from the specific offset position of the second valid data, the second data having the specified byte length is obtained. Thereafter, determine whether the second data and the second fixed data match; if yes, determine that the second game data packet is the second target data packet.

As can be seen, according to the second valid data of the second game data packet, determine whether the second data having the specified byte length which is obtained starting from the specified offset position of the second valid data matches the second fixed data, to determine whether the second game data packet is the second target data packet. Therefore, the second time point at which the second target data packet is received by the target game application can be determined.

In at least one implementation, after calculating the network delay of the target game application according to the first time point and the second time point, the following can be conducted. The first time point is set to zero.

As can be seen, according to the difference between the first time point and the second time point, the current network delay of the target game application can be determined. After the network delay of the target game application is calculated, the first time point can be set to zero to facilitate calculation of next network delay.

In at least one implementation, after setting the first time point to zero, the following can be further conducted. Determine whether the first time point is equal to zero, in response to detecting that the target game application transmits a third game data packet to the server, where the third game data packet is a UDP data packet for detecting the network delay of the target game application, and determine data-packet loss in response to the first time point being not equal to zero, where the data-packet loss indicates that the target game application does not receive the second target data packet transmitted by the server.

In the implementation, if it is detected that the target game application transmits the third game data packet to the server, where the third game data packet is the UDP data packet used for detecting the network delay of the target game application, first determine whether the first time point is equal to zero. If it is determined that the first time point is not equal to zero, it indicates that the target game application does not receive the second target data packet from the server after the target game application transmits the first target data packet, i.e., the data-packet loss occurs. In case of the data-packet loss, the network delay can be determined according to a preset duration, where the preset duration is longer than an average value of historical network delays. For example, if the data-packet loss occurs, it can be determined that the network delay is 500 milliseconds.

As can be seen, since the network delay of the target game application is calculated according to the first time point and the second time point, the first time point is set to zero. When it is detected that the target game application transmits to the server another UDP data packet for detecting the network delay, whether the data-packet loss occurs can be determined by determining whether the first time point is equal to zero.

In at least one implementation, after calculating the network delay of the target game application according to the first time point and the second time point, the following can be further conducted. A network delay of the target game application is calculated multiple times to obtain multiple network delays of the target game application. Network quality of the target game application is determined according to the multiple network delays. Reminding information is outputted, in response to the network quality of the target game application not meeting a preset condition.

As can be seen, since the target game application periodically transmits to the server UDP data packets for detecting network delays, the network delay of the target game application can be continually calculated multiple times to obtain multiple network delays of the target game application, and the network quality of the target game application can be determined according to the multiple network delays, so that when the current network quality does not meet the preset condition, the electronic device can output the reminding information to remind the user. For example, if the target game application is Arena Of Valor: 5v5 Arena Game when the network delay is longer than 150 milliseconds, it is considered that the network delay is relatively large. If the network delay is calculated 100 times and it is found that there are 80 times the network delay is longer than 150 milliseconds, it can be determined that a current network state is not good, and therefore the electronic device can output the reminding information to remind the user whether to continue the game.

As can be seen, the current network quality is determined by calculating the network delay of the target game application multiple times, such that when the network quality is not good, the electronic device can output the reminding information to remind the user of the current network state, and therefore the user can determine whether to continue the game.

Figure 2:
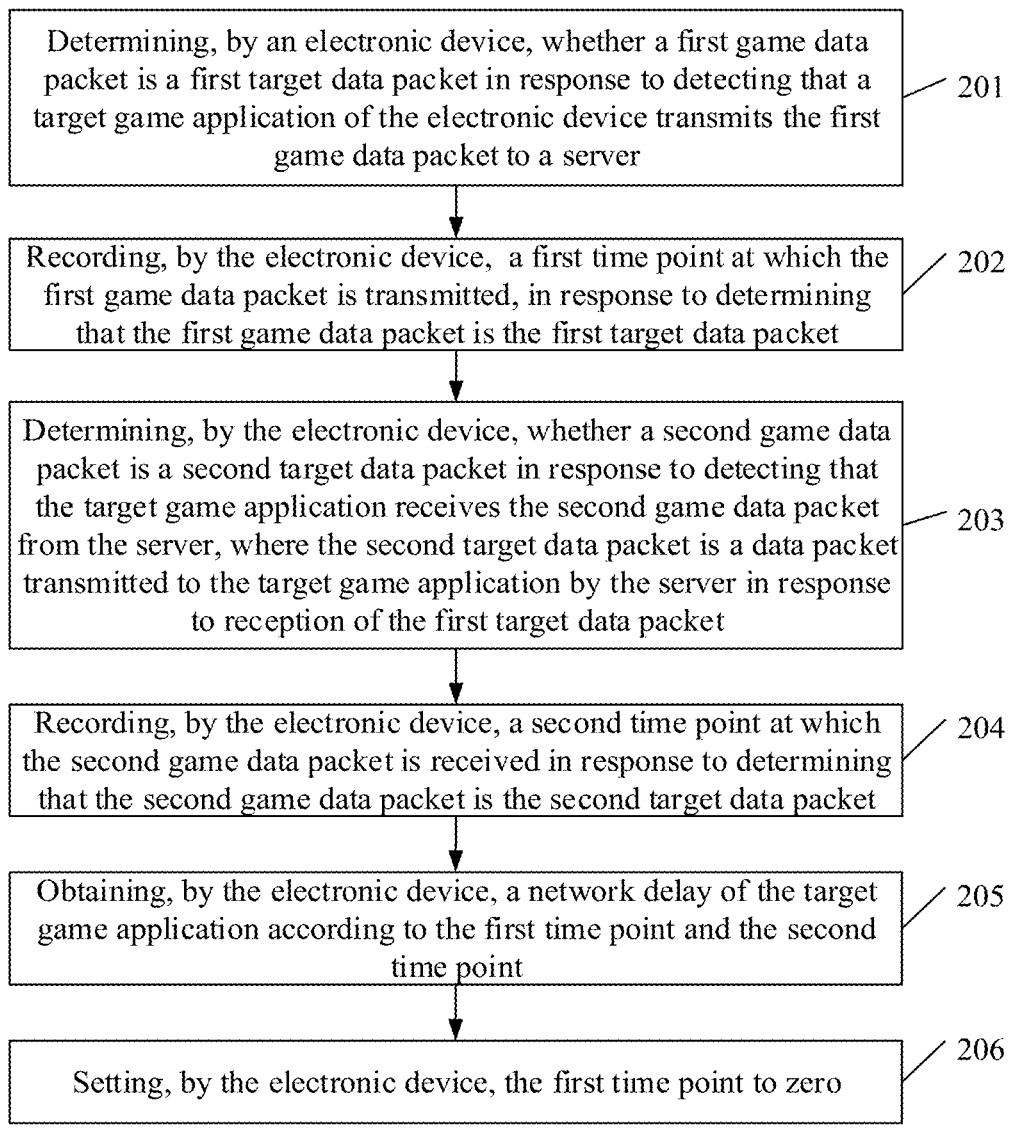
FIG. 2 is a schematic flow chart illustrating a method for network detection according to other implementations of the disclosure.

Similar to the implementations illustrated in FIG. 1A, FIG. 2 is a schematic flow chart illustrating a method for network detection according to other implementations of the disclosure. The method is applicable to an electronic device. As illustrated in FIG. 2, the method begins at block 201.

At block 201, the electronic device determines whether a first game data packet is a first target data packet upon detecting that a target game application of the electronic device transmits the first game data packet to a server.

At block 202, the electronic device records a first time point at which the first game data packet is transmitted upon determining that the first game data packet is the first target data packet.

At block 203, the electronic device determines whether a second game data packet is a second target data packet in response to detecting that the target game application receives the second game data packet from the server, where the second target data packet is a data packet transmitted to the target game application by the server in response to reception of the first target data packet.

At block 204, the electronic device records a second time point at which the second game data packet is received upon determining that the second game data packet is the second target data packet.

At block 205, the electronic device obtains a network delay of the target game application according to the first time point and the second time point.

At block 206, the electronic device sets the first time point to zero.

As can be seen, in the method for network detection, when the electronic device detects that the target game application transmits the first game data packet to the server, the electronic device determines whether the first game data packet is the first target data packet. The electronic device records the first time point at which the first game data packet is transmitted, when the electronic device determines that the first game data packet is the first target data packet. Thereafter, the electronic device determines whether the second game data packet is the second target data packet when the electronic device detects that the target game application receives the second game data packet from the server, where the second target data packet is the data packet transmitted to the target game application by the server in response to reception of the first target data packet, and records the second time point at which the second game data packet is received when the electronic device determines that the second game data packet is the second target data packet. The network delay of the target game application is calculated according to the first time point and the second time point, and the network delay of the target game application is saved. Since the electronic device can record the first time point at which the first target data packet is transmitted by the target game application and the second time point at which the second target data packet is received by the target game application, where the first target data packet and the second target data packet are both used for detecting the network delay of the target game application, the network delay of the target game application can be calculated according to the first time point and the second time point, thereby facilitating network optimization of the target game application.

In addition, according to the difference between the first time point and the second time point, the current network delay of the target game application can be determined. After the network delay of the target game application is calculated, the first time point can be set to zero to facilitate calculation of next network delay.

Figure 3:
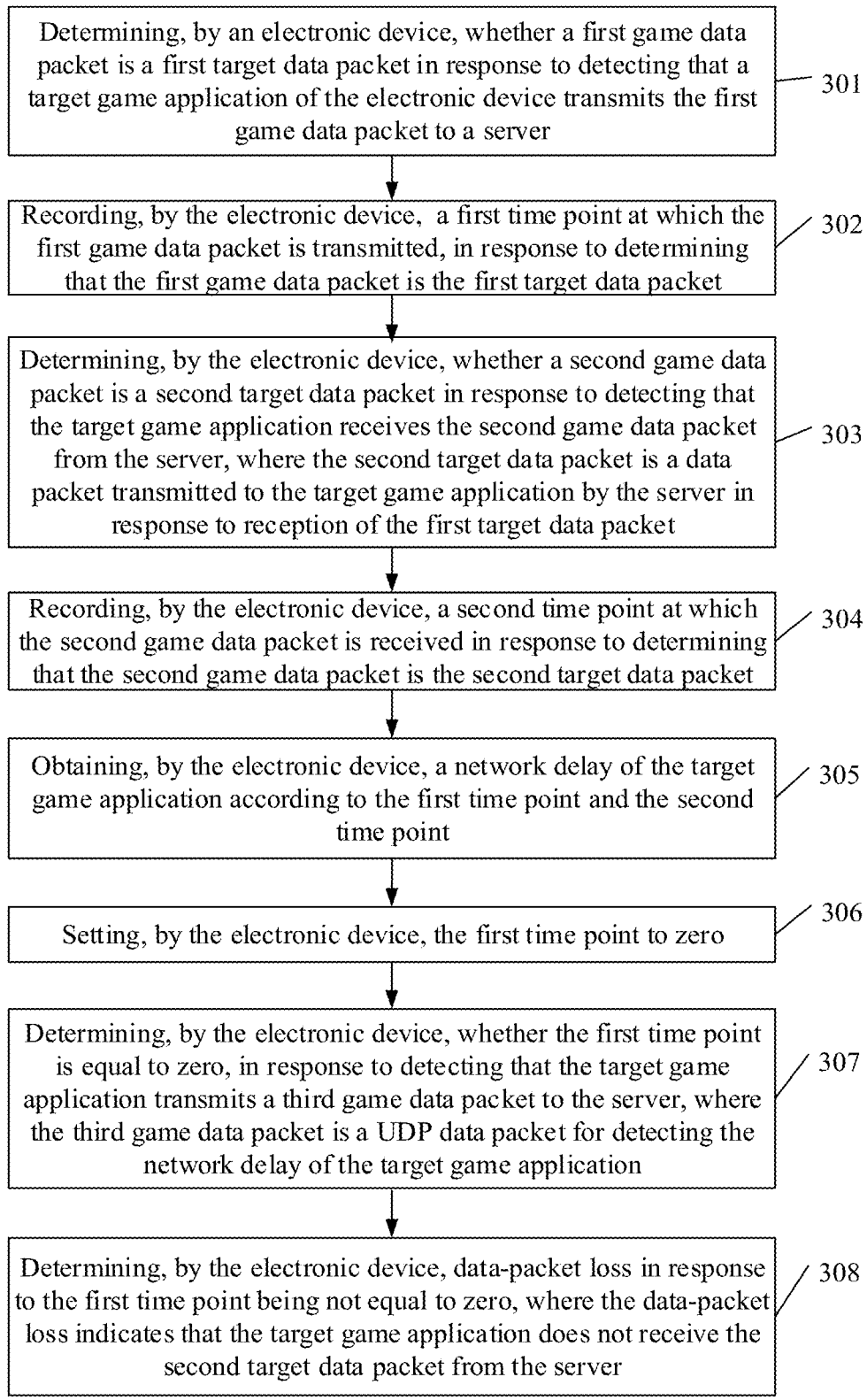
FIG. 3 is a schematic flow chart illustrating a method for network detection according to other implementations of the disclosure.

Similar to the foregoing method in FIG. 1A and FIG. 2, FIG. 3 is a schematic flow chart illustrating a method for network detection according to other implementations of the disclosure. The method is applicable to an electronic device. The electronic device enables multiple wireless communication links. As illustrated in FIG. 3, the method begins at block 301.

At block 301, the electronic device determines whether a first game data packet is a first target data packet upon detecting that a target game application of the electronic device transmits the first game data packet to a server.

At block 302, the electronic device records a first time point at which the first game data packet is transmitted upon determining that the first game data packet is the first target data packet.

At block 303, the electronic device determines whether a second game data packet is a second target data packet in response to detecting that the target game application receives the second game data packet from the server, where the second target data packet is a data packet transmitted to the target game application by the server in response to reception of the first target data packet.

At block 304, the electronic device records a second time point at which the second game data packet is received upon determining that the second game data packet is the second target data packet.

At block 305, the electronic device obtains a network delay of the target game application according to the first time point and the second time point.

At block 306, the electronic device sets the first time point to zero.

At block 307, the electronic device determines whether the first time point is equal to zero, in response to detecting that the target game application transmits a third game data packet to the server, where the third game data packet is a UDP data packet for detecting the network delay of the target game application.

At block 308, the electronic device determines data-packet loss in response to determining that the first time point is not equal to zero, where the data-packet loss indicates that the target game application does not receive the second target data packet from the server.

As can be seen, in the method for network detection, when the electronic device detects that the target game application transmits the first game data packet to the server, the electronic device determines whether the first game data packet is the first target data packet. The electronic device records the first time point at which the first game data packet is transmitted, when the electronic device determines that the first game data packet is the first target data packet. Thereafter, the electronic device determines whether the second game data packet is the second target data packet when the electronic device detects that the target game application receives the second game data packet from the server, where the second target data packet is the data packet transmitted to the target game application by the server in response to reception of the first target data packet, and records the second time point at which the second game data packet is received when the electronic device determines that the second game data packet is the second target data packet. The network delay of the target game application is calculated according to the first time point and the second time point, and the network delay of the target game application is saved. Since the electronic device can record the first time point at which the first target data packet is transmitted by the target game application and the second time point at which the second target data packet is received by the target game application, where the first target data packet and the second target data packet are both used for detecting the network delay of the target game application, the network delay of the target game application can be calculated according to the first time point and the second time point, thereby facilitating network optimization of the target game application.

In addition, according to the difference between the first time point and the second time point, the current network delay of the target game application can be determined. After the network delay of the target game application is calculated, the first time point can be set to zero to facilitate calculation of next network delay.

Figure 4:
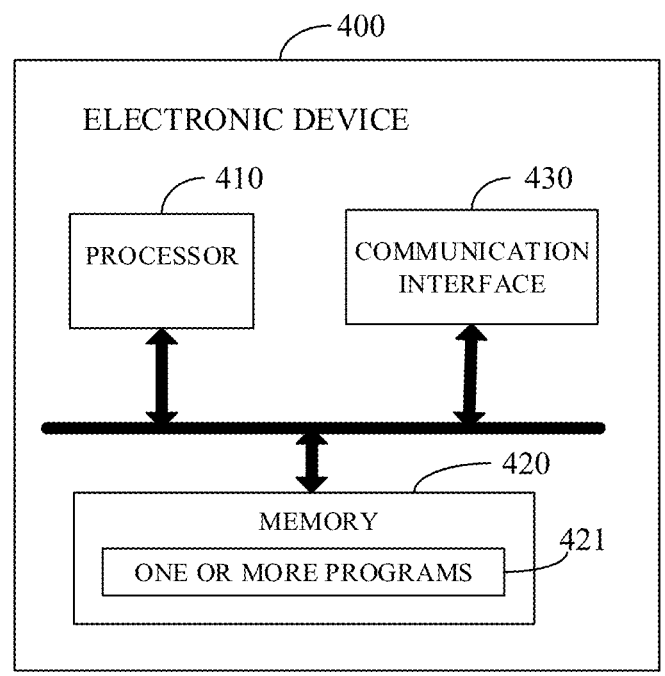
FIG. 4 is a schematic structural diagram illustrating an electronic device according to implementations of the disclosure.

Furthermore, since the network delay of the target game application is calculated according to the first time point and the second time point, the first time point is set to zero, and thus when the electronic device detects that the target game application transmits to the server another UDP data packet used for detecting the network delay, it can determine whether data-packet loss occurs by detecting whether the first time point is equal to zero Similar to the above implementations in FIG. 1A, FIG. 2, and FIG. 3, FIG. 4 is a schematic structural diagram illustrating an electronic device 400 according to implementations of the disclosure. The electronic device 400 runs one or more applications and an operating system. As illustrated in FIG. 4, the electronic device 400 includes a processor 410, a communication interface 430, and a memory 420 storing one or more programs 421. The one or more programs 421 are configured to be performed by the processor 410. The one or more programs 421 include instructions for performing the following operations. Determine whether a first game data packet is a first target data packet in response to detecting that a target game application of the electronic device transmits the first game data packet to a server. A first time point at which the first game data packet is transmitted is recorded, in response to determining that the first game data packet is the first target data packet. Determine whether a second game data packet is a second target data packet in response to detecting that the target game application receives the second game data packet from the server, where the second target data packet is a data packet transmitted to the target game application by the server in response to reception of the first target data packet. A second time point at which the second game data packet is received is recorded in response to determining that the second game data packet is the second target data packet. A network delay of the target game application is obtained according to the first time point and the second time point.

As can be seen, in the implementation of the disclosure, when the electronic device detects that the target game application transmits the first game data packet to the server, the electronic device determines whether the first game data packet is the first target data packet. The electronic device records the first time point at which the first game data packet is transmitted, when the electronic device determines that the first game data packet is the first target data packet. Thereafter, the electronic device determines whether the second game data packet is the second target data packet when the electronic device detects that the target game application receives the second game data packet from the server, where the second target data packet is the data packet transmitted to the target game application by the server in response to reception of the first target data packet, and records the second time point at which the second game data packet is received when the electronic device determines that the second game data packet is the second target data packet. The network delay of the target game application is calculated according to the first time point and the second time point, and the network delay of the target game application is saved. Since the electronic device can record the first time point at which the first target data packet is transmitted by the target game application and the second time point at which the second target data packet is received by the target game application, where the first target data packet and the second target data packet are both used for detecting the network delay of the target game application, the network delay of the target game application can be calculated according to the first time point and the second time point, thereby facilitating network optimization of the target game application.

In one example, the first target data packet and the second target data packet are UDP data packets for detecting the network delay of the target game application, instructions of the one or more programs are further configured to: obtain multiple UDP data packets for detecting the network delay of the target game application, where the multiple UDP data packets include the first target data packet and the second target data packet; obtain multiple pieces of valid data of each of the multiple UDP data packets, where each UDP data packet has a piece of valid data, and for each UDP data packet, the valid data of the UDP data packet is data in the UDP data packet excluding a UDP header; determine, from the multiple pieces of valid data, first fixed data and second fixed data by comparing the multiple pieces of valid data, where the first fixed data has a same byte length and a same position as the second fixed data, the first fixed data is associated with the first target data packet, and the second fixed data is associated with the second target data packet; determine the byte length of the first fixed data and the second fixed data to be a specified byte length associated with the target game application, and determine an offset of first byte data in the first fixed data relative to first byte data in valid data corresponding to the first fixed data or an offset of first byte data in the second fixed data relative to first byte data in valid data corresponding to the second fixed data to be a specified offset.

In one example, in terms of determining whether the first game data packet is the first target data packet, instructions of the one or more programs are configured to: obtain first valid data of the first game data packet; obtain, starting from a specified offset position of the first valid data, first data having a specified byte length; determine that the first game data packet is the first target data packet, in response to detecting that the first data and the first fixed data match.

In one example, in terms of determining whether the second game data packet is the second target data packet, instructions of the one or more programs are configured to: obtain second valid data of the second game data packet; obtain, starting from a specified offset position of the second valid data, second data having a specified byte length; determine that the second game data packet is the second target data packet, in response to detecting that the second data and the second fixed data match.

In one example, after calculating the network delay of the target game application according to the first time point and the second time point, instructions of the one or more programs are further configured to: set the first time point to zero.

In one example, after setting the first time point to zero, instructions of the one or more programs are further configured to: determine whether the first time point is equal to zero, in response to detecting that the target game application transmits a third game data packet to the server, where the third game data packet is a UDP data packet for detecting the network delay of the target game application; determine that data-packet loss occurs in response to determining that the first time point is not equal to zero, where the data-packet loss indicates that the target game application does not receive the second target data packet from the server.

In one example, instructions of the one or more programs are further configured to: determine that the network delay of the target game application is a preset duration in response to determining that the data-packet loss occurs, where the preset duration is longer than an average value of historical network delays.

In one example, in terms of calculating the network delay of the target game application according to the first time point and the second time point, instructions of the one or more programs are configured to: calculate an absolute value of a difference between the first time point and the second time point; determine the absolute value as the network delay of the target game application.

In one example, after calculating the network delay of the target game application according to the first time point and the second time point, instructions of the one or more programs are further configured to: calculate a network delay of the target game application multiple times to obtain multiple network delays of the target game application; determine network quality of the target game application according to the multiple network delays; output reminding information, on condition that the network quality of the target game application does not meet a preset condition.

The foregoing implementations mainly introduce the solution of the implementation of the disclosure from the perspective of performing the process on the method side. It can be understood that the electronic device includes corresponding hardware structures and/or software modules for performing the respective functions in order to implement the above functions. Those skilled in the art will readily appreciate that the disclosure can be implemented in hardware or a combination of hardware and computer software in combination with the elements and algorithm steps of the various examples described in the implementations disclosed herein. Whether a function is implemented in hardware or computer software to drive hardware depends on the specific application and design constraints of the solution. A person skilled in the art can use different methods for each particular application to implement the described functionality, but such implementation should not be considered to be beyond the scope of the application.

In the implementations of the disclosure, the electronic device may be divided into functional unit according to the method implementations. For example, the functional units may be divided according to various functions, or two or more functions may be integrated into one processing unit. The integrated unit can be implemented in the form of hardware or in the form of a software functional unit. It should be noted that the unit division in the implementation of the disclosure is illustrative and only a logical function division, and there can be other manners of division during actual implementations.

Figure 5:
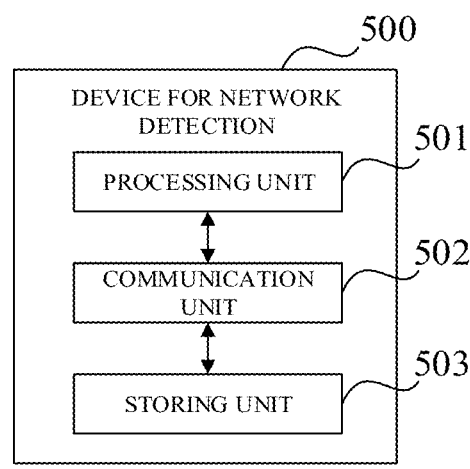
FIG. 5 is a block diagram illustrating functional units of a device for network detection according to implementations of the disclosure.

FIG. 5 is a block diagram illustrating functional units of a device 500 for network detection according to implementations of the disclosure. The device 500 is applicable to an electronic device. The electronic device includes a processing unit 501 and a communication unit 502. The processing unit 501 is configured to determine whether a first game data packet is a first target data packet in response to detecting that a target game application of the electronic device transmits the first game data packet to a server via the communication unit 502; record a first time point at which the first game data packet is transmitted, in response to determining that the first game data packet is the first target data packet; determine whether a second game data packet is a second target data packet in response to detecting that the target game application receives the second game data packet from the server via the communication unit 502, where the second target data packet is a data packet transmitted to the target game application by the server in response to reception of the first target data packet; record a second time point at which the second game data packet is received in response to determining that the second game data packet is the second target data packet; calculate a network delay of the target game application according to the first time point and the second time point and saving the network delay.

As can be seen, in the implementation, when the electronic device detects that the target game application transmits the first game data packet to the server, the electronic device determines whether the first game data packet is the first target data packet. The electronic device records the first time point at which the first game data packet is transmitted, when the electronic device determines that the first game data packet is the first target data packet. Thereafter, the electronic device determines whether the second game data packet is the second target data packet when the electronic device detects that the target game application receives the second game data packet from the server, where the second target data packet is the data packet transmitted to the target game application by the server in response to reception of the first target data packet, and records the second time point at which the second game data packet is received when the electronic device determines that the second game data packet is the second target data packet. The network delay of the target game application is calculated according to the first time point and the second time point, and the network delay of the target game application is saved. Since the electronic device can record the first time point at which the first target data packet is transmitted by the target game application and the second time point at which the second target data packet is received by the target game application, where the first target data packet and the second target data packet are both used for detecting the network delay of the target game application, the network delay of the target game application can be calculated according to the first time point and the second time point, thereby facilitating network optimization of the target game application.

In at least one implementation, the first target data packet and the second target data packet are UDP data packets for detecting the network delay of the target game application, and the processing unit 501 is further configured to: obtain multiple UDP data packets for detecting the network delay of the target game application, where the multiple UDP data packets comprise the first target data packet and the second target data packet; obtain valid data of each of the multiple UDP data packets to obtain multiple pieces of valid data, where for each UDP data packet, the valid data of the UDP data packet is data in the UDP data packet excluding a UDP header; determine, from the multiple pieces of valid data, first fixed data and second fixed data by comparing the multiple pieces of valid data, where the first fixed data has a same byte length and a same position as the second fixed data, the first fixed data is associated with the first target data packet, and the second fixed data is associated with the second target data packet; determine the byte length of the first fixed data and the second fixed data to be a specified byte length associated with the target game application, and determine an offset of first byte data in the first fixed data relative to first byte data in valid data corresponding to the first fixed data to be a specified offset or determine an offset of first byte data in the second fixed data relative to first byte data in valid data corresponding to the second fixed data to be the specified offset.

In at least one implementation, the processing unit 501 configured to determine whether the first game data packet is the first target data packet is configured to: obtain first valid data of the first game data packet; obtain, starting from a specified offset position of the first valid data, first data having a specified byte length; determine that the first game data packet is the first target data packet, in response to detecting that the first data and the first fixed data match.

In at least one implementation, the processing unit 501 configured to determine whether the second game data packet is the second target data packet is configured to: obtain second valid data of the second game data packet; obtain, starting from a specified offset position of the second valid data, second data having a specified byte length; determine that the second game data packet is the second target data packet, in response to detecting that the second data and the second fixed data match.

In at least one implementation, the processing unit 501 is further configured to set the first time point to zero, after calculating the network delay of the target game application according to the first time point and the second time point.

In at least one implementation, after setting the first time point to zero, the processing unit 501 is further configured to: determine whether the first time point is equal to zero, in response to detecting that the target game application transmits a third game data packet to the server, where the third game data packet is a UDP data packet for detecting the network delay of the target game application; determine that data-packet loss occurs in response to determining that the first time point is not equal to zero, where the data-packet loss indicates that the target game application does not receive the second target data packet from the server.

In at least one implementation, the processing unit 501 is further configured to determine that the network delay of the target game application is a preset duration in response to determining that the data-packet loss occurs, where the preset duration is longer than an average value of historical network delays.

In at least one implementation, after calculating the network delay of the target game application according to the first time point and the second time point, the processing unit 501 is further configured to: calculate a network delay of the target game application multiple times to obtain multiple network delays of the target game application; determine network quality of the target game application according to the multiple network delays; output reminding information, on condition that the network quality of the target game application does not meet a preset condition.

In at least one implementation, the processing unit 501 configured to calculate the network delay of the target game application according to the first time point and the second time point is configured to: calculate an absolute value of a difference between the first time point and the second time point; determine the absolute value as the network delay of the target game application.

The device 500 further includes a storing unit 503. The storing unit 503 is configured to store programs and data of the electronic device. The processing unit 501 may be a processor. The communication unit 502 may be a touch screen or a transceiver, and the storage unit 503 may be a memory.

Implementations of the disclosure also provide a computer storage medium. The computer storage medium is configured to store computer programs for electronic data interchange. The computer programs, when executed, are operable with a computer to perform all or part of the operations of any of the methods described in the above-described method implementation. The computer includes an electronic device.

Implementations of the disclosure also provide a computer program product. The computer program product includes a non-transitory computer-readable storage medium storing computer programs. The computer programs are operable with a computer to perform all or part of the operations of any of the methods described in the above method implementations. The computer program product may be a software installation package. The computer may be an electronic device.

It is to be noted that, for the sake of simplicity, the foregoing method implementations are described as a series of action combinations, however, it will be appreciated by those skilled in the art that the disclosure is not limited by the sequence of actions described. According to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the device/apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or not performed. In addition, coupling or communication connection between each illustrated or discussed component may be direct coupling or communication connection, or may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the disclosure. The memory includes various medium capable of storing program codes, such as a universal serial bus (USB) flash disk, a read-only memory (ROM), a RAM, a removable hard disk, a disk, a CD, or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The foregoing illustrates the implementations of the disclosure in detail. The principle and implementations of the disclosure are illustrated by specific examples. The illustration of the above implementations is merely used to facilitate understanding of the methods and core concept of the disclosure. For a person skilled in the art, according to the concept of the disclosure, specific implementations and application ranges may be both changed. Based on the above, the disclosure shall not be understood to be limited to the specification.

What is claimed is:

1. A method for network detection for an electronic device, comprising:
   determining whether a first game data packet is a first target data packet in response to detecting that a target game application of the electronic device transmits the first game data packet to a server;
   recording a first time point at which the first game data packet is transmitted, in response to determining that the first game data packet is the first target data packet;
   determining whether a second game data packet is a second target data packet in response to detecting that the target game application receives the second game data packet from the server, wherein the second target data packet is a data packet transmitted to the target game application by the server in response to reception of the first target data packet;
   recording a second time point at which the second game data packet is received in response to determining that the second game data packet is the second target data packet; and
   obtaining a network delay of the target game application according to the first time point and the second time point;
   wherein determining whether the first game data packet is the first target data packet comprises:
      obtaining first valid data of the first game data packet;
      obtaining first data, the first data having a specified byte length from a specified offset position of the first valid data; and
      determining that the first game data packet is the first target data packet, in response to detecting that the first data and the first fixed data match.

2. The method of claim 1, wherein the first target data packet and the second target data packet are user datagram protocol (UDP) data packets for detecting the network delay of the target game application, and the method further comprises:
   obtaining a plurality of UDP data packets for detecting the network delay of the target game application, wherein the plurality of UDP data packets comprise the first target data packet and the second target data packet;
   obtaining a plurality of pieces of valid data of each of the plurality of UDP data packets, wherein each UDP data packet has a piece of valid data, and for each UDP data packet, the valid data of the UDP data packet is data in the UDP data packet excluding a UDP header;
   determining, from the plurality of pieces of valid data, first fixed data and second fixed data by comparing the plurality of pieces of valid data, wherein the first fixed data has a same byte length and a same position as the second fixed data, the first fixed data is associated with the first target data packet, and the second fixed data is associated with the second target data packet; and
   determining the byte length of the first fixed data and the second fixed data as a specified byte length associated with the target game application, and determining an offset of first byte data in the first fixed data relative to first byte data in valid data corresponding to the first fixed data as a specified offset or determining an offset of first byte data in the second fixed data relative to first byte data in valid data corresponding to the second fixed data as the specified offset.

3. The method of claim 1, wherein determining whether the second game data packet is the second target data packet comprises:
   obtaining second valid data of the second game data packet;
   obtaining second data, the second data having a specified byte length from a specified offset position of the second valid data; and
   determining that the second game data packet is the second target data packet, in response to detecting that the second data and the second fixed data match.

4. The method of claim 1, further comprising:
   after obtaining the network delay of the target game application according to the first time point and the second time point,
      setting the first time point to zero.

5. The method of claim 4, further comprising:
   after setting the first time point to zero,
      determining whether the first time point is equal to zero, in response to detecting that the target game application transmits a third game data packet to the server, wherein the third game data packet is a UDP data packet for detecting the network delay of the target game application; and
      determining data-packet loss in response to the first time point being not equal to zero, wherein the data-packet loss indicates that the target game application does not receive the second target data packet from the server.

6. The method of claim 5, further comprising:
   determining that the network delay of the target game application is a preset duration in response to determining the data-packet loss, wherein the preset duration is longer than an average value of historical network delays.

7. The method of claim 1, further comprising:
   after obtaining the network delay of the target game application according to the first time point and the second time point,
      obtaining a plurality of network delays of the target game application;
      determining network quality of the target game application according to the plurality of network delays; and outputting reminding information in response to the network quality of the target game application not meeting a preset condition.

8. The method of claim 1, wherein obtaining the network delay of the target game application according to the first time point and the second time point comprises:
obtaining an absolute value of a difference between the first time point and the second time point; and
determining the absolute value as the network delay of the target game application.

9. An electronic device, comprising:
a processor; and
a memory coupled to the processor and storing one or more programs;
the one or more programs which, when executed by the processor, cause the processor to:
determine whether a first game data packet is a first target data packet in response to detecting that a target game application of the electronic device transmits the first game data packet to a server;
record a first time point at which the first game data packet is transmitted, in response to determining that the first game data packet is the first target data packet;
determine whether a second game data packet is a second target data packet in response to detecting that the target game application receives the second game data packet from the server, wherein the second target data packet is a data packet transmitted to the target game application by the server in response to reception of the first target data packet;
record a second time point at which the second game data packet is received in response to determining that the second game data packet is the second target data packet; and
obtain a network delay of the target game application according to the first time point and the second time point;
wherein the one or more programs executed by the processor to determine whether the first game data packet is the first target data packet are executed by the processor to:
obtain first valid data of the first game data packet;
obtain first data, the first data having a specified byte length from a specified offset position of the first valid data; and
determine that the first game data packet is the first target data packet, in response to detecting that the first data and the first fixed data match.

10. The electronic device of claim 9, wherein the first target data packet and the second target data packet are user datagram protocol (UDP) data packets for detecting the network delay of the target game application, and the one or more programs, when executed by the processor, further cause the processor to:
obtain a plurality of UDP data packets for detecting the network delay of the target game application, wherein the plurality of UDP data packets comprise the first target data packet and the second target data packet;
obtain a plurality of pieces of valid data of each of the plurality of UDP data packets, wherein each UDP data packet has a piece of valid data, and for each UDP data packet, the valid data of the UDP data packet is data in the UDP data packet excluding a UDP header;
determine, from the plurality of pieces of valid data, first fixed data and second fixed data by comparing the plurality of pieces of valid data, wherein the first fixed data has a same byte length and a same position as the second fixed data, the first fixed data is associated with the first target data packet, and the second fixed data is associated with the second target data packet; and
determine the byte length of the first fixed data and the second fixed data as a specified byte length associated with the target game application, and determine an offset of first byte data in the first fixed data relative to first byte data in valid data corresponding to the first fixed data as a specified offset or determine an offset of first byte data in the second fixed data relative to first byte data in valid data corresponding to the second fixed data as the specified offset.

11. The electronic device of claim 9, wherein the one or more programs executed by the processor to determine whether the second game data packet is the second target data packet are executed by the processor to:
obtain second valid data of the second game data packet;
obtain second data, the second data having a specified byte length from a specified offset position of the second valid data; and
determine that the second game data packet is the second target data packet, in response to detecting that the second data and the second fixed data match.

12. The electronic device of claim 9, wherein the one or more programs, when executed by the processor, further cause the processor to set the first time point to zero, after obtaining the network delay of the target game application according to the first time point and the second time point.

13. The electronic device of claim 12, wherein the one or more programs, when executed by the processor, further cause the processor to:
after setting the first time point to zero,
determine whether the first time point is equal to zero, in response to detecting that the target game application transmits a third game data packet to the server, wherein the third game data packet is a UDP data packet for detecting the network delay of the target game application; and
determine data-packet loss in response to the first time point being not equal to zero, wherein the data-packet loss indicates that the target game application does not receive the second target data packet from the server.

14. The electronic device of claim 13, wherein the one or more programs, when executed by the processor, further cause the processor to:
determine that the network delay of the target game application is a preset duration in response to determining the data-packet loss, wherein the preset duration is longer than an average value of historical network delays.

15. The electronic device of claim 9, wherein the one or more programs, when executed by the processor, further cause the processor to:
after obtaining the network delay of the target game application according to the first time point and the second time point,
obtain a plurality of network delays of the target game application;
determine network quality of the target game application according to the plurality of network delays; and
output reminding information in response to the network quality of the target game application not meeting a preset condition.

16. The electronic device of claim 9, wherein the one or more programs executed by the processor to obtain the network delay of the target game application according to the first time point and the second time point are executed by the processor to:

obtain an absolute value of a difference between the first time point and the second time point; and determine the absolute value as the network delay of the target game application.

17. A non-transitory computer-readable storage medium storing computer programs, wherein the computer programs, when executed by a processor, cause the processor to:

determine whether a first game data packet is a first target data packet in response to detecting that a target game application of an electronic device transmits the first game data packet to a server;

record a first time point at which the first game data packet is transmitted, in response to determining that the first game data packet is the first target data packet;

determine whether a second game data packet is a second target data packet in response to detecting that the target game application receives the second game data packet from the server, wherein the second target data packet is a data packet transmitted to the target game application by the server in response to reception of the first target data packet;

record a second time point at which the second game data packet is received in response to determining that the second game data packet is the second target data packet; and obtain a network delay of the target game application according to the first time point and the second time point;

wherein the computer programs executed by the processor to determine whether the first game data packet is the first target data packet are executed by the processor to:

obtain first valid data of the first game data packet;

obtain first data, the first data having a specified byte length from a specified offset position of the first valid data; and determine that the first game data packet is the first target data packet, in response to detecting that the first data and the first fixed data match.

18. The non-transitory computer-readable storage medium of claim 17, wherein the first target data packet and the second target data packet are user datagram protocol (UDP) data packets for detecting the network delay of the target game application, and the computer programs, when executed by the processor, further cause the processor to:

obtain a plurality of UDP data packets for detecting the network delay of the target game application, wherein the plurality of UDP data packets comprise the first target data packet and the second target data packet;

obtain a plurality of pieces of valid data of each of the plurality of UDP data packets, wherein each UDP data packet has a piece of valid data, and for each UDP data packet, the valid data of the UDP data packet is data in the UDP data packet excluding a UDP header;

determine, from the plurality of pieces of valid data, first fixed data and second fixed data by comparing the plurality of pieces of valid data, wherein the first fixed data has a same byte length and a same position as the second fixed data, the first fixed data is associated with the first target data packet, and the second fixed data is associated with the second target data packet; and determine the byte length of the first fixed data and the second fixed data as a specified byte length associated with the target game application, and determine an offset of first byte data in the first fixed data relative to first byte data in valid data corresponding to the first fixed data as a specified offset or determine an offset of first byte data in the second fixed data relative to first byte data in valid data corresponding to the second fixed data as the specified offset.

* * * * *